(12) United States Patent
Fraser et al.

(10) Patent No.: US 12,522,510 B2
(45) Date of Patent: Jan. 13, 2026

(54) SODIUM SULFATE BY-PRODUCT PROCESSING IN LITHIUM AND BATTERY CHEMICAL PRODUCTION

(71) Applicant: HATCH LTD., Mississauga (CA)

(72) Inventors: Robert John Fraser, Oakville (CA); Evangelos Stamatiou, Toronto (CA)

(73) Assignee: Hatch Ltd.

( * ) Notice: Subject to any disclaimer, the term of this patent is extended or adjusted under 35 U.S.C. 154(b) by 0 days.

(21) Appl. No.: 17/977,523

(22) Filed: Oct. 31, 2022

(65) Prior Publication Data

US 2023/0052881 A1 Feb. 16, 2023

Related U.S. Application Data

(63) Continuation of application No. PCT/CA2022/050237, filed on Feb. 18, 2022.

(60) Provisional application No. 63/150,797, filed on Feb. 18, 2021.

(51) Int. Cl.
| | |
|---|---|
| *C01D 1/20* | (2006.01) |
| *B01J 41/04* | (2017.01) |
| *B01J 41/12* | (2017.01) |
| *B01J 49/57* | (2017.01) |
| *C01D 3/04* | (2006.01) |
| *C01D 5/02* | (2006.01) |

(52) U.S. Cl.
CPC ............... *C01D 1/20* (2013.01); *B01J 41/04* (2013.01); *B01J 41/12* (2013.01); *B01J 49/57* (2017.01); *C01D 3/04* (2013.01); *C01D 5/02* (2013.01); *C01P 2006/40* (2013.01)

(58) Field of Classification Search
CPC ..... C01D 1/20; C01D 3/04; C01D 5/02; B01J 49/57; B01J 41/04; B01J 41/12; C01P 2006/40
USPC .......................................................... 423/522
See application file for complete search history.

(56) References Cited

U.S. PATENT DOCUMENTS

| | | | |
|---|---|---|---|
| 3,656,937 | A | 4/1972 | Gandon et al. |
| 4,698,139 | A | 10/1987 | Fugleberg et al. |
| 8,431,005 | B1 | 4/2013 | Zbranek |
| 2017/0077564 | A1 | 3/2017 | Wang et al. |
| 2018/0155208 | A1 | 6/2018 | Chow et al. |

(Continued)

FOREIGN PATENT DOCUMENTS

| | | |
|---|---|---|
| CA | 3076688 A1 | 4/2019 |
| CL | 202300096 A1 | 7/2023 |
| CL | 202301276 A1 | 11/2023 |

(Continued)

OTHER PUBLICATIONS

International Search Report and Written Opinion for International Application No. PCT/CA2022/050237, date of mailing Aug. 8, 2022.

(Continued)

*Primary Examiner* — Colin W. Slifka
(74) *Attorney, Agent, or Firm* — Bordner Ladner Gervais LLP; Brandon Evenson

(57) ABSTRACT

A process for battery chemical production, where a sodium sulfate stream is treated with an ion exchange process to provide potassium sulfate and sodium chloride. The sodium chloride may be treated with a chlor-alkali to produce sodium hydroxide for use upstream in the battery chemical production process.

29 Claims, 7 Drawing Sheets

(56) References Cited

U.S. PATENT DOCUMENTS

2019/0152797 A1   5/2019  Liu et al.

FOREIGN PATENT DOCUMENTS

| CN | 109279667 A | | 1/2019 | |
|---|---|---|---|---|
| CN | 109734107 A | | 5/2019 | |
| CN | 111762847 A | | 10/2020 | |
| EP | 0199104 A2 | * | 10/1986 | |
| EP | 3670686 A1 | | 6/2020 | |
| JP | 2017149609 A | | 8/2017 | |
| WO | WO-2011083053 A1 | * | 7/2011 | ............ C01B 17/34 |
| WO | WO2018067224 A1 | | 4/2018 | |
| WO | 2018167224 A1 | | 9/2018 | |
| WO | 2020061639 A1 | | 4/2020 | |
| WO | 2022009004 A1 | | 1/2022 | |
| WO | 2022094706 A1 | | 5/2022 | |

OTHER PUBLICATIONS

International Preliminary Report on Patentability for International Application No. PCT/CA2022/050237, date of completion of the report Jul. 20, 2023.

International Preliminary Report on Patentability for International Application No. PCT/CA2022/050237, date of completion of the report May 18, 2023.

Extended European Search Report for EP Application No. 22755449.0, mailing date of May 26, 2025, 29 pages.

Office Action for Saudi Application No. 206/33041, issued May 13, 2025, 5 pages and its English translation.

Gallerani, Peter A., "Bleed & Feed for Process Solution Control," Plating and Surface Finishing, 2009, pp. 26-28.

Nan, J. et al., "Recovery of Metal Values from a Mixture of Spent Lithium-ion Batteries and Nickel-metal Hydride Batteries", Hydrometallurgy, 2006, vol. 84(1-2) pp. 75-80.

Tsuen-Ni, L. et al., "Chemical Reclaiming of Nickel Sulfate from Nickel-Bearing Wastes," Conservation & Recycling, 1983, vol. 6(1-2), pp. 55-62.

Yang, Y. et al., "Stepwise Recycling of Valuable Metals From Ni-rich Cathode Material of Spent Lithium-ion Batteries", Waste Management, Elsevier, New York, 2019, vol. 102, pp. 131-138.

Office Action for European Patent Application No. 22755449.0 issued on Jun. 13, 2025.

Chilean Patent Application No. 202302438, Office Action dated Aug. 5, 2025.

* cited by examiner

US 12,522,510 B2

SODIUM SULFATE BY-PRODUCT PROCESSING IN LITHIUM AND BATTERY CHEMICAL PRODUCTION

CROSS-REFERENCE TO RELATED APPLICATIONS

This application claims priority to each of U.S. Provisional Patent Application 63/150,797, filed Feb. 18, 2021, and PCT application PCT/CA2022/050237 filed Feb. 18, 2022; the contents of each of which is incorporated herein by references it its entirety.

FIELD

The present disclosure relates to battery chemical production, and in particular, processing of sodium sulfate by-products.

BACKGROUND

Climate change is driving electrification of transportation, and as a result, the need for batteries, such as lithium ion batteries (LIBs). Although LIBs are already ubiquitous in society, the total annual consumption is small compared to that which would be required for mass-market electric vehicle adoption. With a growing demand for LIBs, there is a growing demand for the chemicals from which they are produced, particularly battery-grade metal sulfates.

Producing battery-grade metal sulfates results in by-product salts for which disposal may be difficult. Often in current battery chemical production processes, SX and other impurity removal steps must be operated at a specific pH level to perform effectively. One of the bases generally used is sodium hydroxide because it is water soluble and available at high purities, allowing for effective pH control while minimizing scaling issues and minimizing the introduction of further impurities to the process. High consumption of sodium hydroxide, however, leads to the production of large quantities of sodium sulfate, which presents a serious impending environmental challenge. Sodium sulfate is a bulk commodity chemical product, but because of its low value (e.g., at 90-150 USD per tonne), transport costs frequently negate the benefit of its sale when no local demand exists. Further, the market for sodium sulfate is limited, and may be exceeded by the forecasted production resulting from new battery chemicals and battery precursor plants.

BRIEF DESCRIPTION OF THE FIGURES

Embodiments of the present disclosure will now be described, by way of example only, with reference to the attached Figures.

DETAILED DESCRIPTION

Figure 1:
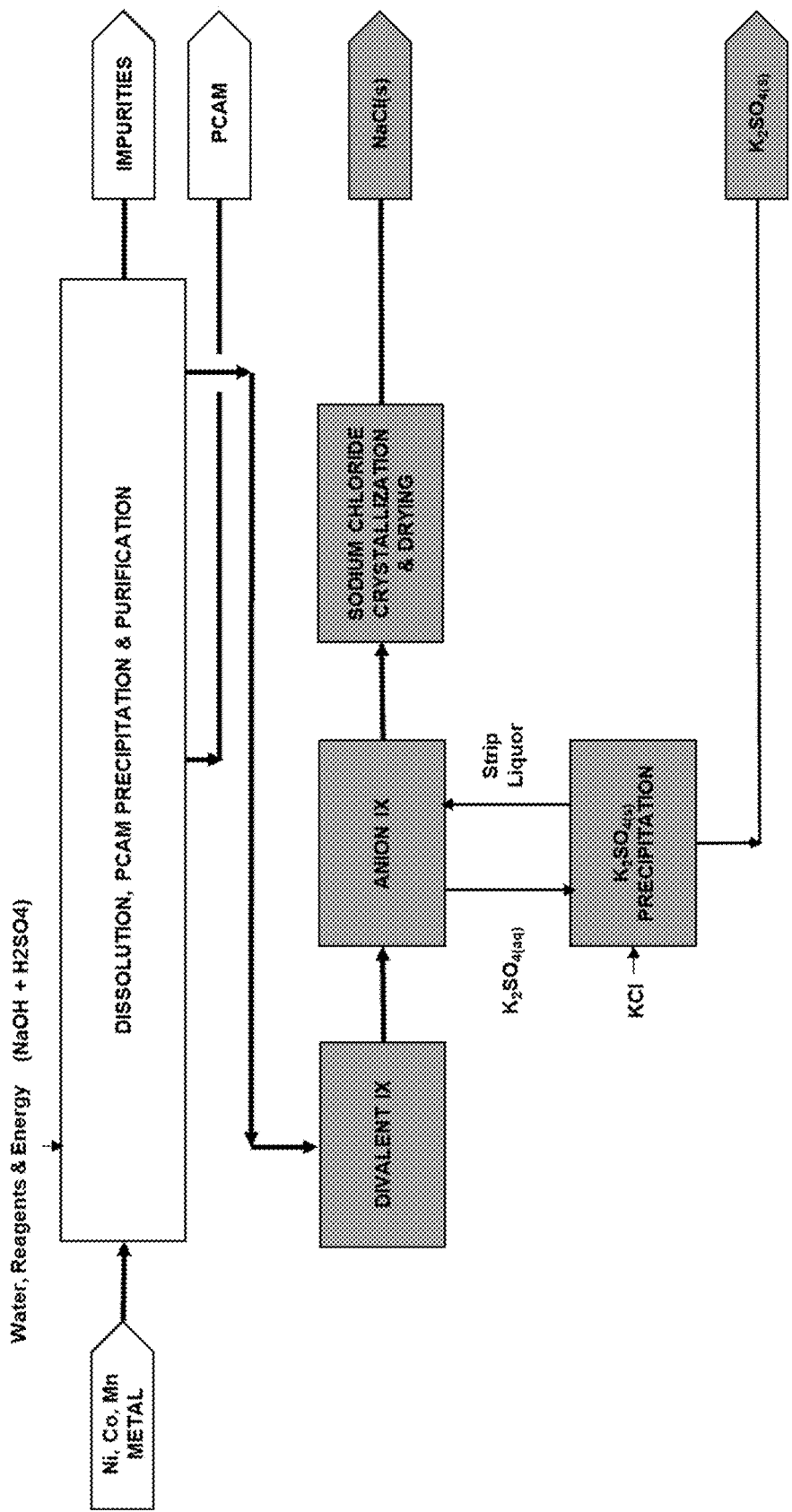
FIG. 1 is a schematic diagram of a process for potassium sulfate production from a sodium sulfate by-product of nickel, cobalt, and/or manganese processing, according to an embodiment of the present disclosure.

The present disclosure provides processes for lithium or battery chemical production using a sodium sulfate stream to produce potassium sulfate, and the process may additionally produce sodium hydroxide. Battery chemical production may include lithium-bearing, nickel-bearing, cobalt-bearing, manganese-bearing compounds used for cathode production and/or production of other components within lithium-ion batteries. The sodium sulfate stream may be a by-product of the battery chemical production process, and the sodium hydroxide may be for use upstream in battery chemical production. The sodium sulfate stream may be a by-product of the reaction between a sodium-based base solution and sulfate (either as acid or other forms in solution). This process may assist with upgrading a less useful by-product into a more valuable/desirable product(s), increase process efficiency and/or reduce waste. The process may upgrade sodium sulfate into a more useful product, such as fertilizer ($K_2SO_4$) and salt (NaCl). The process may upgrade sodium sulfate into a reagent the existing processing facility may utilize, such as sodium hydroxide (NaOH). The process may convert sodium sulfate into another by-product, such as sodium chloride. The process may convert sodium sulfate into another by-product which is of higher value, or easier or more environmentally friendly to dispose of.

The process may include: receiving at least a portion of a sodium sulfate stream; and treating the sodium sulfate stream with an ion exchange process to provide potassium sulfate and sodium chloride, such as a potassium sulfate solution and a sodium chloride brine. The process may include: treating the potassium sulfate solution with potassium chloride to precipitate at least a portion of the potassium sulfate. The process may include treating the sodium chloride brine to remove residual sulphate. The process may include applying a chlor-alkali process to the sodium chloride brine to provide sodium hydroxide. The process may include returning at least a portion of the sodium hydroxide for use upstream in the battery chemical production or lithium chemical production process.

The sodium sulfate stream may be any suitable stream or feedstock comprising sodium sulfate, or any source of sulfate anion suitable for forming a soluble sulfate solution. The sodium sulfate may be a by-product of battery chemical production. The sodium sulfate stream may be from a metal sulfate production process, a lithium hydroxide production process, a battery chemical precursor production process, or a process that consumes sodium hydroxide. Lithium production from some feedstocks, such as ore, can also result in a sodium sulfate waste stream, and said waste stream may be suitable for use as the sodium sulfate stream according to embodiments of the present disclosure. The metal sulfate production process may be a process for producing nickel sulfate, cobalt sulfate, or manganese sulfate. The sodium sulfate stream may be a solid comprising sodium sulfate. The sodium sulfate stream may be a solution, such as an aqueous solution, containing sodium sulfate. The sodium sulfate stream may be pre-treated prior to use in the processes disclosed herein, such as to form an aqueous solution of soluble sulfate for use in an ion exchange process.

The ion exchange process according to one or more embodiments of the present disclosure may include: providing an aqueous solution of soluble sulfate; contacting an ion exchange resin with the aqueous solution of soluble sulfate to load the ion exchange resin with sulfate ion; and contacting the loaded ion exchange resin with an aqueous solution of potassium chloride to form a mixed potassium sulfate/potassium chloride exit brine. The exit brine may be treated in any suitable manner to recover the potassium sulfate, such as treatment with potassium chloride to salt out the potassium sulfate. The potassium sulfate salted out of the exit brine may be separated to provide solid potassium sulfate and a potassium chloride brine. The resultant potassium chloride brine may be recycled for use upstream in the ion exchange process. The ion exchange process may use any suitable stationary phase, such as weak base anion exchange resins or strong base anion exchange resins. The ion exchange process may further comprise a regeneration cycle. The ion exchange resin may be regenerated with a sodium sulfate solution, such as the sodium sulfate stream or an aqueous solution derived from the sodium sulfate stream. The regeneration cycle may provide an exit regeneration brine containing sodium chloride. The sodium chloride brine may contain sulfate and/or other impurities. The sodium chloride brine may be treated to remove sulfate, such as by adding sodium chloride to salt out sodium sulfate.

In one or more embodiments, the process produces sodium chloride, such as a sodium chloride brine. Sodium chloride brine can contain traces of other salts, such as residual KCl, $K_2SO_4$, $Na_2SO_4$, and/or other trace impurities. The sodium chloride brine may be treated to remove residual impurities, such as residual sulfate. The sodium chloride brine may be treated with a chlor-alkali process to provide sodium hydroxide. The chlor-alkali process may also provide chlorine in the form of $Cl_2$ or HCl. The sodium hydroxide may be used upstream in the process, or for any other process that requires sodium hydroxide. The sodium hydroxide may be for use in a nickel sulfate production process, a cobalt sulfate production process, an iron removal process, a process for converting lithium sulfate to lithium hydroxide, or a precursor chemical cathode material process.

FIG. 1 shows the production of potassium sulfate from the sodium sulfate by-product of the production of precursor cathode active material (PCAM) from nickel, cobalt, and/or manganese metal. The process of FIG. 1 involves divalent ion exchange of the sodium sulfate stream, followed by an anion exchange process to produce: a sodium chloride brine that may be crystallized and dried to produce sodium chloride salt; and a potassium sulfate solution to which potassium chloride is added to precipitate the potassium sulfate, which may be recovered. The strip liquor of the potassium sulfate precipitation may be re-used in the anion exchange.

Figure 2:
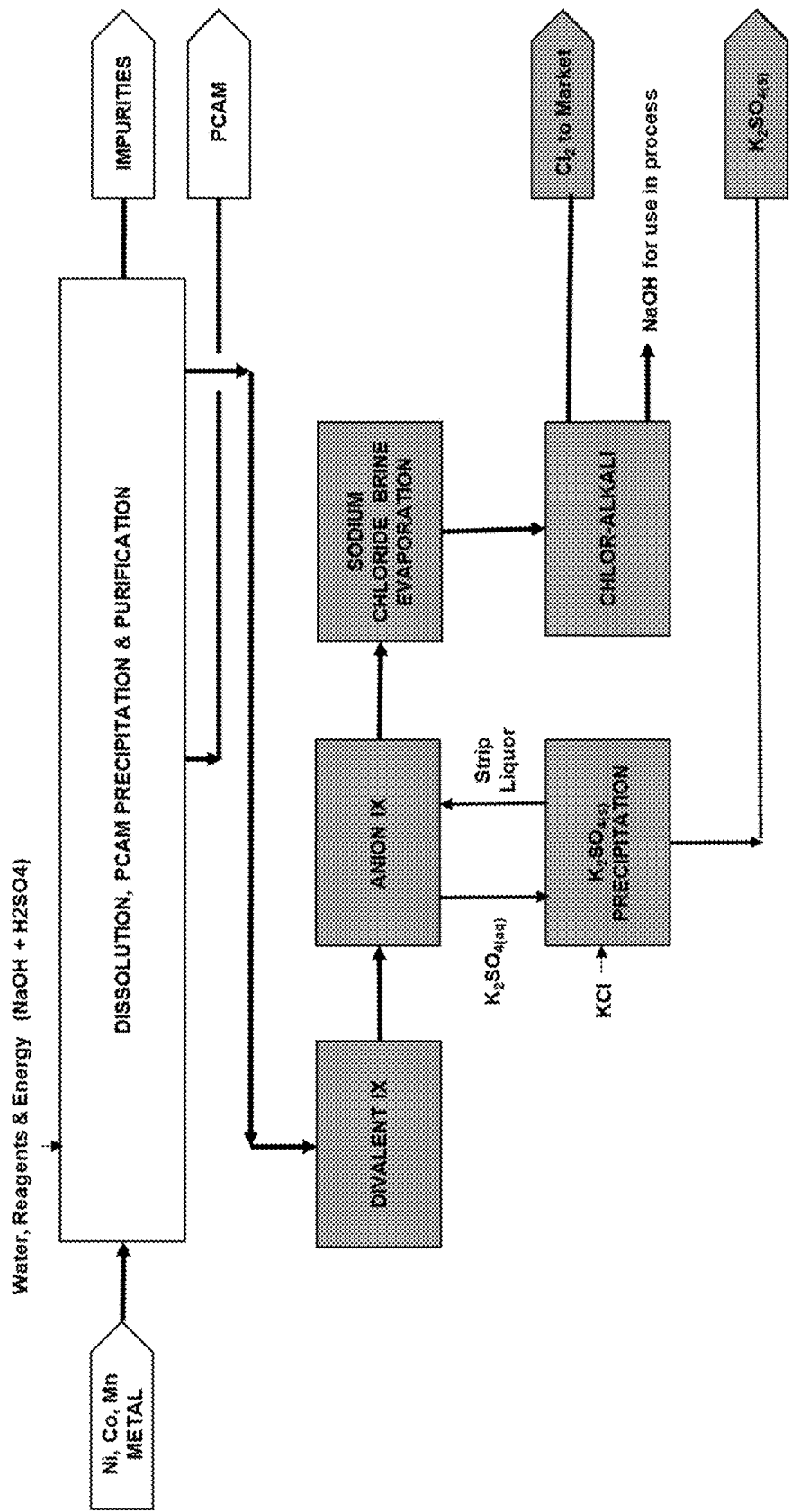
FIG. 2 is a schematic diagram of a process for potassium sulfate production and sodium hydroxide production from a sodium sulfate by-product of nickel, cobalt, and/or manganese processing, according to an embodiment of the present disclosure.

FIG. 2 shows a process for the production of potassium sulfate similar to that of FIG. 1 except that the sodium chloride brine produced in the anion exchange process is further processed. The sodium chloride brine of FIG. 2 is evaporated and purified before treatment with a chlor-alkali process to produce chlorine (as $Cl_2$) and sodium hydroxide for use in the process.

Figure 3:
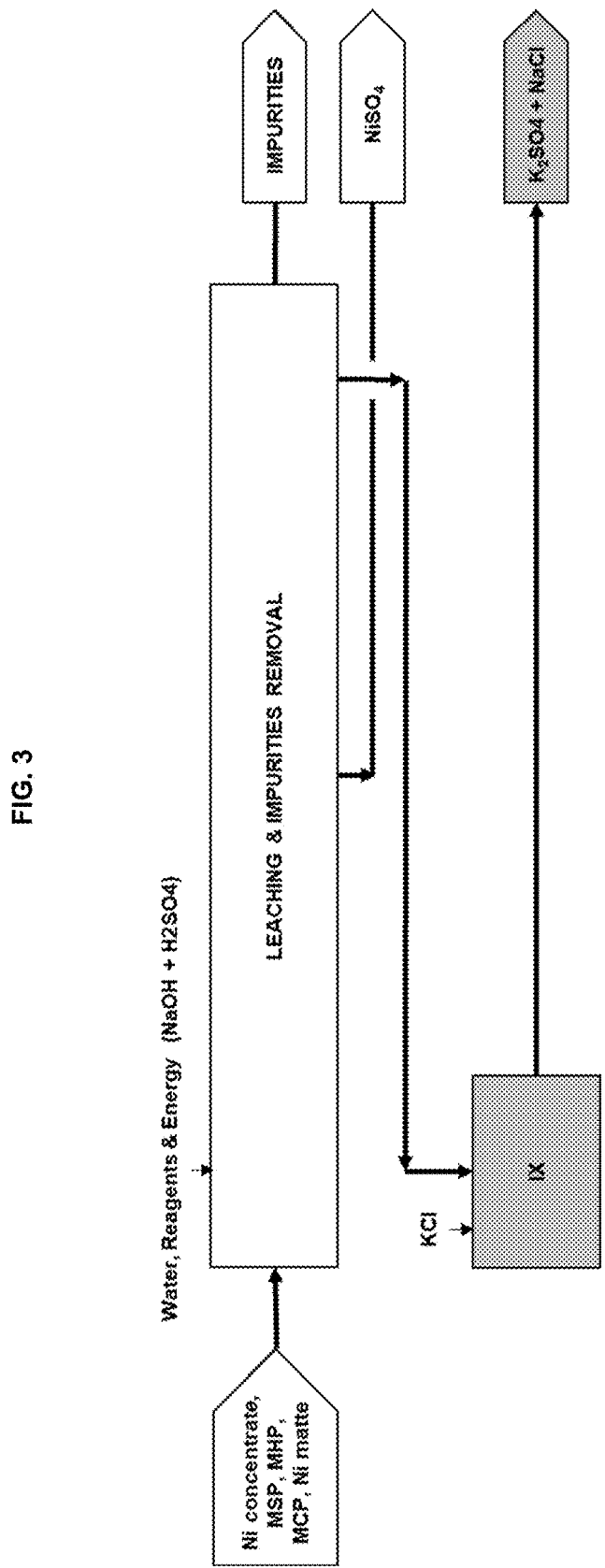
FIG. 3 is a schematic diagram of a process for potassium sulfate production from a sodium sulfate by-product of battery chemical production, according to an embodiment of the present disclosure.

FIG. 3 shows a process for battery chemical production (top) and the additional process (bottom) of conversion of the sodium sulfate by-product to potassium sulfate by an ion exchange process. The ion exchange process used in FIG. 3 may be according to an embodiment of the present disclosure, such as the process described in FIG. 1 or 2.

Figure 4:
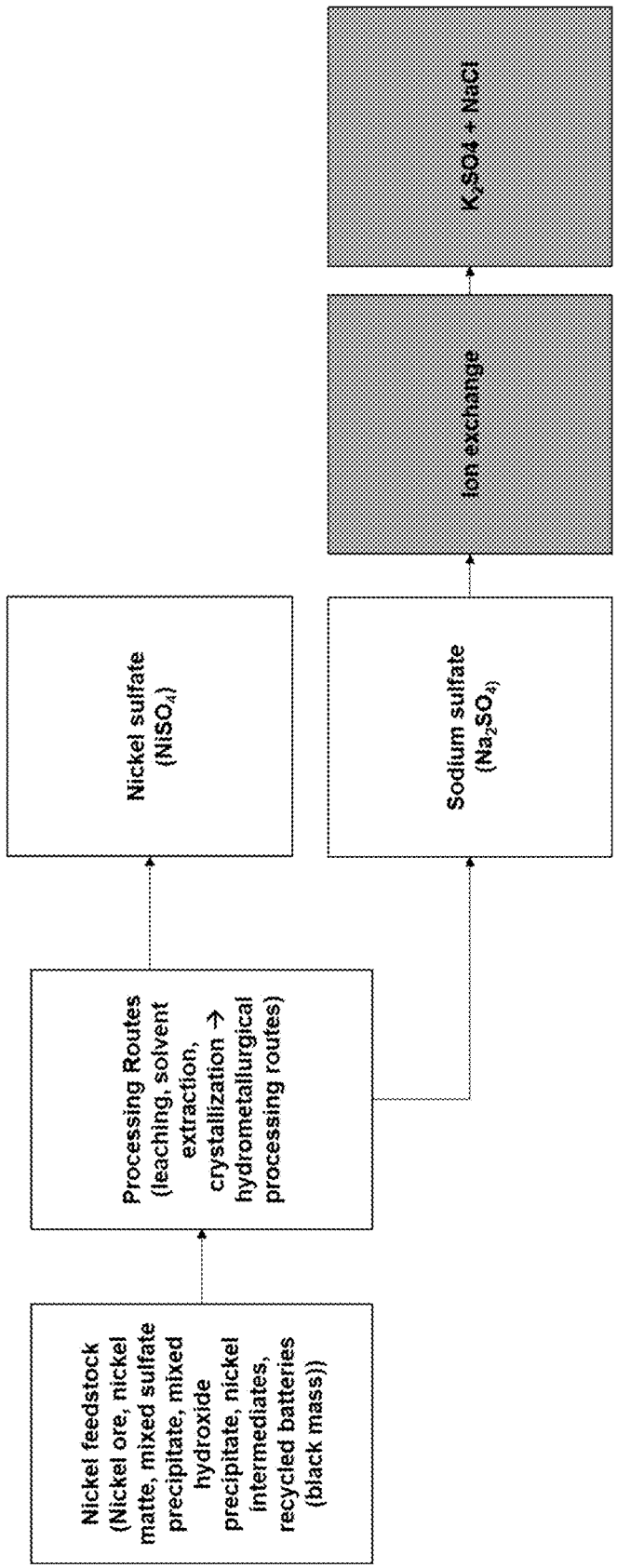
FIG. 4 is a schematic diagram of a process for potassium sulfate production from a sodium sulfate by-product of nickel sulfate production, according to an embodiment of the present disclosure.

FIG. 4 shows a process for the production of potassium sulfate from a nickel feedstock. The nickel feedstock of FIG. 4 is processed to yield nickel sulfate and sodium sulfate, and the sodium sulfate is further processed via ion exchange to give potassium sulfate and sodium chloride.

Figure 5:
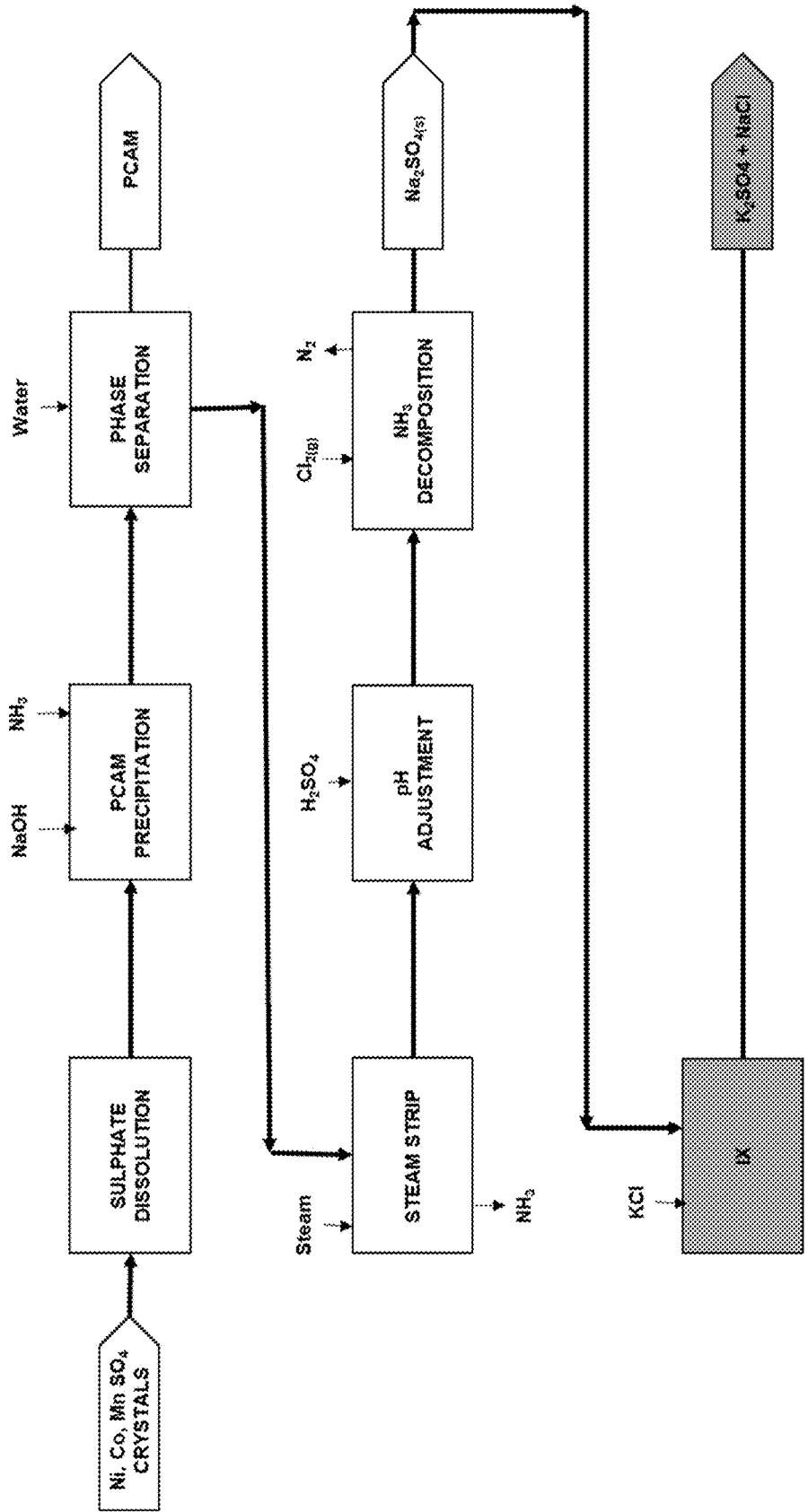
FIG. 5 is a schematic diagram of a process for potassium sulfate production from a sodium sulfate by-product of precursor cathode active material (PCAM) production, according to an embodiment of the present disclosure.

FIG. 5 shows a process for the production of potassium sulfate and sodium chloride from the sodium sulfate by-product of a precursor cathode active material (PCAM) production process.

Figure 6:
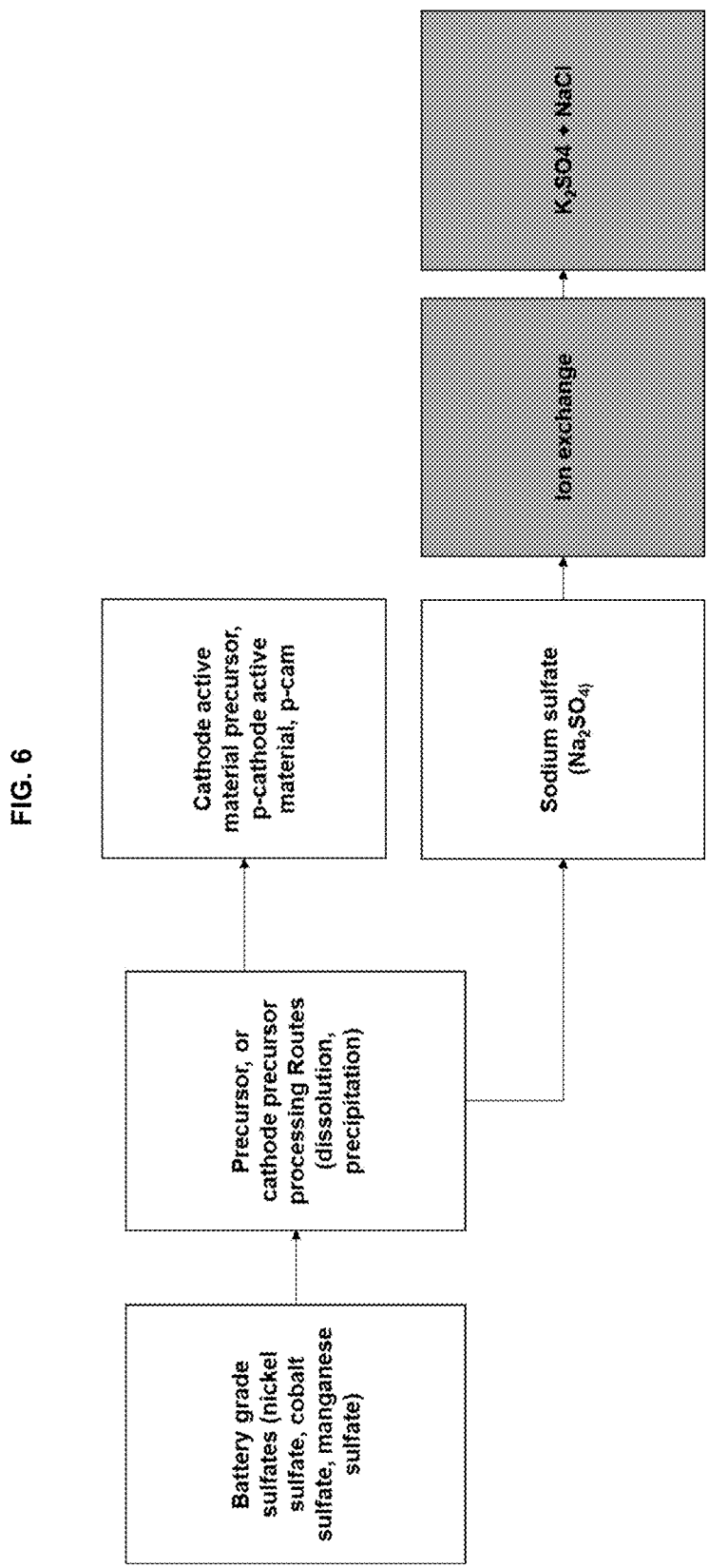
FIG. 6 is a schematic diagram of a process for potassium sulfate production from a sodium sulfate by-product of precursor cathode active material (PCAM) production, according to an embodiment of the present disclosure.

FIG. 6 shows a process for the production of potassium sulfate from a battery grade sulfate. The battery grade sulfate of FIG. 6 is processed to yield precursor cathode active material (PCAM) and sodium sulfate, and the sodium sulfate is further processed via ion exchange to give potassium sulfate and sodium chloride.

The sodium chloride produced by the processes described in FIG. 1, or 3-6 may be further treated, such as with a chlor-alkali process to yield sodium hydroxide and chlorine.

Figure 7:
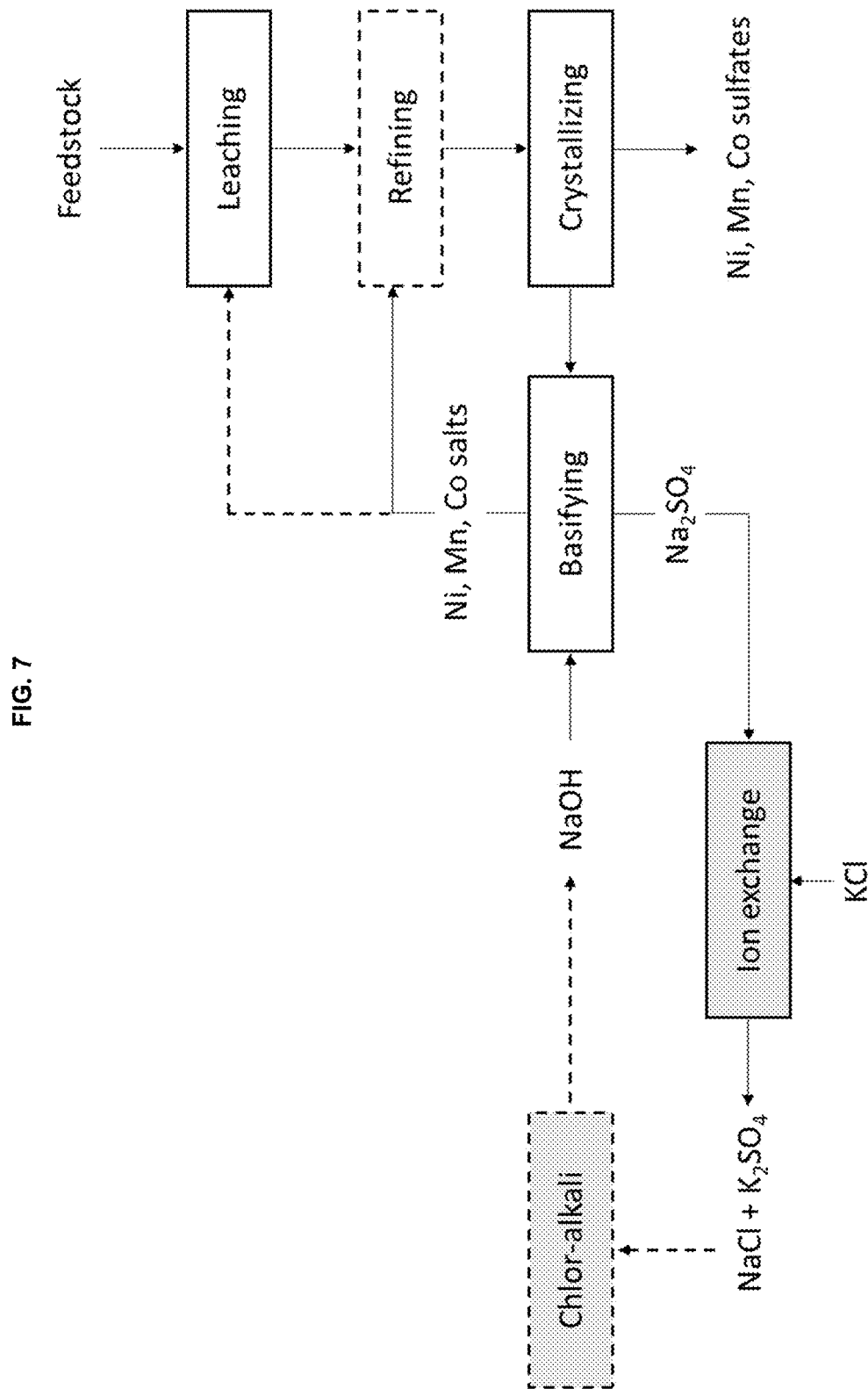
FIG. 7 is a schematic diagram of a process for generating metal sulfates, according to an embodiment of the present disclosure.

FIG. 7 shows a process for generating metal sulfates, which also produces a sodium sulfate stream. The sodium sulfate produced in FIG. 7 can be further processed according to the present disclosure, to yield potassium sulfate and sodium chloride. The sodium chloride thereby produced may be further treated, such as with a chlor-alkali process to yield sodium hydroxide and chlorine. The sodium hydroxide thereby produced may be used elsewhere in the process, such as in a basifying step.

Processes for Generating Metal Sulfate

Battery precursor chemicals may be formed by adding sodium hydroxide to a mixture of nickel, cobalt, and/or manganese sulfates. Said addition may be in the presence of other additives or reagents, such as ammonia. The addition of sodium hydroxide to battery precursor chemicals such as nickel, cobalt, and/or manganese sulfates results in the precipitation of metal hydroxides. Upon recovery of the metal hydroxides, the filtrate may include sodium sulfate. The sodium sulfate by-product of battery chemical production may be crystallized or further purified. The sodium sulfate by-product of battery chemical production may be used, with or without further purification, as the sodium sulfate stream in the process according to one or more embodiments herein described.

In one aspect, there is provided a process for generating a metal sulfate, the process comprising: crystallizing a metal sulfate from an aqueous solution to form a crystallized metal sulfate in a mother liquor, the mother liquor comprising an uncrystallized metal sulfate; separating the crystallized metal sulfate from the mother liquor; basifying a portion of the mother liquor with sodium hydroxide to convert the uncrystallized metal sulfate to a basic metal salt, thereby forming a sodium sulfate stream; using the basic metal salt upstream of crystallizing the metal sulfate; and applying an ion exchange process to the sodium sulfate stream to provide potassium sulfate and sodium chloride. The process may further comprise applying a chlor-alkali process to the sodium chloride to provide sodium hydroxide. The process may further comprise returning at least a portion of the sodium hydroxide for use in a battery chemical production process. For example, the sodium hydroxide may be for use in basifying a portion of mother liquor obtained from crystallizing metal sulfate. The crystallizing may further comprise bleeding the mother liquor and controlling the bleed rate to selectively inhibit crystallizing an impurity when crystallizing the metal sulfate. The crystallizing may further comprise controlling an amount of free water in the crystallizer to selectively inhibit crystallizing an impurity when crystallizing the metal sulfate. Controlling the amount of free water may comprise controlling the rate of water evaporation from the crystallizer or controlling the addition of water to the crystallizer. Basifying the portion of the mother liquor to convert the uncrystallized metal sulfate to the basic metal salt may further comprise: bleeding the mother liquor and controlling the bleed rate to produce an amount of the basic metal salt that is at least approximately equivalent to an amount of the acid to be neutralized upstream of crystallizing the metal sulfate. The crystallized metal sulfate may be battery-grade crystallized metal sulfate.

In one or more embodiments of the process for generating metal sulfate described herein, the process further comprises leaching a feedstock and forming the aqueous solution comprising the metal sulfate. In one or more embodiments, the feedstock comprises any one or combination of mixed hydroxide precipitates, mixed sulfide precipitates, nickel sulfide concentrate, cobalt sulfide concentrate, nickel laterite, nickel matte, ferronickel, material derived from recycled lithium ion batteries or lithium ion battery manufacturing scrap, or spent cathode material. In one or more embodiments of the process described herein, the process further comprises isolating the basic metal salt from the mother liquor. In one or more embodiments, isolating the basic metal salt comprises using a one-stage or two-stage precipitation circuit and selectively precipitating the basic metal salt. In one or more embodiments of the process described herein, the metal sulfate is any one or combination of nickel sulfate, cobalt sulfate, or manganese sulfate. In one or more embodiments of the process described herein, the basic metal salt comprises a metal hydroxide. In one or more embodiments, the metal hydroxide comprises any one or a combination of nickel hydroxide, cobalt hydroxide, or manganese hydroxide.

In one or more embodiments of the process for generating metal sulfate described herein, crystallizing the metal sulfate comprises selectively crystallizing any one or two of the nickel sulfate, manganese sulfate, and cobalt sulfate from the aqueous solution. In one or more embodiments of the process described herein, crystallizing the metal sulfate comprises selectively crystallizing any combination of the nickel sulfate, manganese sulfate, and cobalt sulfate from the aqueous solution. In one or more embodiments of the process described herein, the crystallized metal sulfate is a battery-grade crystallized metal sulfate, or an electroplating-grade crystallized metal sulfate.

In one or more embodiments, the process for generating metal sulfate as described herein further comprises refining the aqueous solution comprising the metal sulfate (e.g., a sulfate-matrix, pregnant leach solution (PLS), where the PLS is subjected to any one or combination of refining stages (also referred to herein as impurity or component removal stages) to remove specific impurities or components such as: Cu (e.g., via sulfiding, solvent extraction, cementation, ion exchange, etc.), Fe and Al (e.g., via precipitation, ion exchange, etc.), Zn (e.g., via sulfiding, solvent extraction, ion exchange, etc.), Co (e.g. via solvent extraction, ion exchange, precipitation etc.), Ca (e.g. via solvent extraction, ion exchange, etc.), Mg (e.g. via solvent extraction, ion exchange etc.), F (e.g. via calcium/lime addition), or graphite (e.g. via filtration). The refined PLS may be introduced into a crystallizer under conditions sufficient to selectively crystalize any one or combination of nickel sulfate ($NiSO_4$), cobalt sulfate ($CoSO_4$), manganese sulfate ($MnSO_4$), and lithium sulfate ($Li_2SO_4$) from the refined PLS to produce crystallized metal sulfates in a mother liquor (e.g., via a forced circulation crystallizer under vacuum, etc., against lithium, magnesium, sodium, or potassium depending on the feedstock). These crystallized metal sulfates are then isolated from the mother liquor (e.g., discharged from the crystallizer). If one crystallization cycle (e.g., using one crystallizer) is insufficient to produce crystallized metal sulfates (which may occur, e.g., with feedstocks containing higher concentrations of impurities), the crystals discharged from the crystallizer may be dissolved in pure water to form aqueous sulfate solutions before being introduced into a second crystallization cycle (e.g., using a second crystallizer) to be recrystallized.

After crystallization, the mother liquor contains undesired salts/metals (e.g., $Li_2SO_4$, $MgSO_4$, $Na_2SO_4$ etc.), as well as metal sulfates that did not crystallize out of solution (also referred to herein as the uncrystallized metal sulfate). To selectively recover these uncrystallised metal sulfates from the remaining undesired materials in solution, the mother liquor is bled from the crystallizer(s), and basified to convert the uncrystallised metal sulfates into basic metal salts, such as metal hydroxides (e.g., $Ni(OH)_2$, $Co(OH)_2$, $Mn(OH)_2$, etc.). These metal hydroxides are used up-stream to neutralize acids introduced during the leaching that formed the PLS and/or the refining stages of the process, thus converting the metal hydroxides back to metal sulfates that can then be isolated via crystallization. Prior to use upstream, the metal hydroxides may be isolated from the mother liquor and washed, and may be reslurried with water for transfer, which can limit exposure to air and thus limit oxidation of the hydroxides.

In addition to using the metal hydroxides as neutralizing agents, the process may also use external sources of neutralizing agents (e.g., added oxides, hydroxides) to basify the mother liquor coming out of the crystallizer, and optionally to neutralize acids introduced during leaching and/or the refining stages. These external neutralizing agents are selected either for their capacity to be regenerated from their waste product (e.g., via electrolysis, etc.), to minimize or avoid forming waste streams (e.g., $CaO/CaCO_3$ as agents, $CaSO_4 \cdot 2H_2O$ as waste product; NaOH as agent, $Na_2SO_4$ as waste product); or for their capacity to generate higher valued by-products (e.g., KOH as agent, $K_2SO_4$ as by-product). In one or more embodiments, NaOH is used as a neutralizing agent and a sodium sulfate stream is formed in the basifying step.

Generally, the process of generating a metal sulfate is largely feedstock-agnostic, and can tolerate raw feedstocks (e.g., concentrates, mixed hydroxide/sulfide precipitates, other Ni-based feedstocks) and recycled feedstocks (e.g., spent battery materials). The process may also include leaching feedstocks under conditions (e.g. pressure leaching, pressure oxidation) to form the aqueous solution comprising the metal sulfate (e.g., the sulfate-matrix, pregnant leach solution (PLS). The process may produce any one or combination of crystalized nickel sulfate ($NiSO_4$), cobalt sulfate ($CoSO_4$), manganese sulfate ($MnSO_4$), and lithium sulfate ($Li_2SO_4$). The process may produce any one or two of crystalized nickel sulfate ($NiSO_4$), cobalt sulfate ($CoSO_4$), and manganese sulfate ($MnSO_4$). The process may produce all three of crystalized nickel sulfate ($NiSO_4$), cobalt sulfate ($CoSO_4$), and manganese sulfate ($MnSO_4$). Of the crystallized metal sulfates isolated from the process, some may be battery-grade. Of the crystallized metal sulfates isolated from the process, some may be suitable for use in electroplating. Of the crystallized metal sulfates isolated from the process, some may be metal sulfate hydrates (e.g., crystallized metal sulfates and water molecules combined in a variety of ratios as an integral part of the crystal; for example, a ratio of one water molecule per metal sulfate, or six water molecules per metal sulfate, or seven water molecules per metal sulfate).

In one or more embodiments of the process described herein, the process comprises leaching a feedstock and forming the aqueous solution comprising the metal sulfate. For example, the process may begin with an input of one or more feedstocks. Suitable feedstocks include any feedstock that comprises any one or a combination of nickel (Ni), cobalt (Co), manganese (Mn), or lithium (Li). In some embodiments, the feedstock may comprise any one or combination of a raw feedstock, and a recycled materials feedstock. Examples of raw feedstocks include, but are not limited to, mixed hydroxide precipitates (MHP), mixed sulfide precipitates (MSP), nickel sulfide concentrate, cobalt sulphide concentrate, nickel laterite, nickel matte, or ferronickel. Examples of recycled materials feedstocks include, but are not limited to, spent cathode material, and material derived from recycled lithium ion batteries or lithium ion battery manufacturing scrap (collectively, referred to herein as black mass).

The feedstock may be leached under conditions to form an aqueous solution comprising a metal sulfate (PLS); for example, a sulfate-matrix, pregnant leach solution. Generally, leaching conditions comprise reacting the feedstock with an acidic leachate stream that may comprise: an acid stream; an acid stream and hydrogen peroxide; an acid stream and sulphur dioxide; or an acid stream and another reductant, such as sucrose. The leaching conditions may also comprise solubilizing the feedstock by oxidizing it in a pressure vessel using oxygen or air. In forming the sulfate-matrix PLS, the acid stream may act as a sulfate source, and comprise, e.g., sulfuric acid; or the acid stream and/or the feedstock may act as a sulfate source.

There are a number of leaching conditions that may be suitable for forming the PLS. Based on the type or source of feedstock to be processed, a skilled person would recognize which leaching conditions to select and test, in order to confirm the selection and to define the specific conditions. For example, leaching may occur at ambient, or above ambient temperatures and/or pressures. For feedstocks comprising MHP or black mass, leaching may occur at temperatures of about 65° C. and at atmospheric pressures, e.g., with the addition of acid and reducing agents. For feedstocks comprising MSP or nickel matte, leaching may occur via pressure leaching and/or pressure oxidation at temperatures between 150 and 220° C.

The leaching conditions may be selected to minimize use of acid or base reagents. For example, the leaching conditions may comprise countercurrent leaching, which involves contacting and flowing the feedstock and acidic leachate stream in opposing directions. Using such a countercurrent flow can increase leaching efficiencies and decrease acid reagent use at the leaching stage. By reducing acid reagent use, countercurrent leaching can also reduce base reagent use, as there would be less acid passing downstream in the process that would need to be later neutralized by a base. In some embodiments, the leaching conditions may comprise pressure leaching, which by oxidation of sulfides in the feedstock, may generate sulfates and thus not require additional acid reagent to be used to solubilize metals in the feedstock.

In one or more embodiments, the process for generating metal sulfate as described herein comprises refining the aqueous solution comprising the metal sulfate (e.g., a sulfate-matrix, pregnant leach solution (PLS), where the PLS is subjected to any one or combination of refining stages (also referred to herein as impurity or component removal stages) to remove specific impurities or components.

Following leaching, the PLS may undergo one or more refining stages to refine the PLS by removing one or more impurities or components. The type and amount of impurities or components to be removed is dependent, at least in part, on the type of feedstock from which the PLS is formed, as well as the specifications for the final product generated by the process (e.g., purity, grade, when only one or two of nickel sulfate ($NiSO_4$), cobalt sulfate ($Co-SO_4$), and manganese sulfate ($MnSO_4$) are required, etc.). Examples of impurities or components to be removed include, but are not limited to, sodium (Na), aluminum (Al), iron (Fe), copper (Cu), zinc (Zn), lithium (Li), cobalt (Co), and manganese (Mn). Components that may need to be removed may include any one or two of nickel, cobalt, and manganese, such that only one or two of crystallized nickel sulfate ($NiSO_4$), cobalt sulfate ($CoSO_4$), and manganese sulfate ($MnSO_4$) are isolated from the crystallizer; e.g., for use as a final product, such as battery-grade metal sulfate(s). Otherwise, all three of nickel sulfate ($NiSO_4$), cobalt sulfate ($CoSO_4$), and manganese sulfate ($MnSO_4$) are isolated from the crystallizer. When battery-grade metal sulfates are required, there are specific product specifications (e.g., limits) for such impurities that are tolerated for, e.g., battery-grade nickel sulfate; and any such impurities that are present in a process' feedstock, water, or reagents in an amount that exceeds said product specification would need to have their concentration reduced.

There are many suitable methods for removing impurities or components from the PLS. Such methods include, but are not limited to precipitation, atmospheric or pressure leaching, sulfidation, solvent extraction, ion exchange, and cementation. Selecting the appropriate method (and operational conditions thereof) depends, at least in part, on the type and amount of impurities or components to be removed, as well as the specifications for the final product generated by the process. For example, copper may be removed via precipitation, solvent extraction, sulfidation, cementation, or ion exchange, etc.; iron and aluminum may be removed via precipitation, or ion exchange, etc.; zinc may be removed via sulfidation, solvent extraction, or ion exchange, etc.; and cobalt may be removed via solvent extraction, ion exchange, or oxidative precipitation etc. The conditions and operational parameters for each method are generally known and can be selected depending on the type and amount of impurity or component to be removed.

For example, cementation is a process involving a redox reaction between a first metal ion and a first solid metal, whereby the first metal ion is reduced to a second solid metal by the first, and the first solid metal is in turn oxidized to a second metal ion. Cementation may be selected for removing, e.g., copper because it can add value metals to the process (for example, by adding Ni if nickel powder is used as the first solid metal) without the use of other reagents; and/or because it can allow removal of impurities (for example, by reduction) without having to add acid or base reagents to the process.

The refining stages for removing impurities or components from the PLS may be selected to minimize use of acid or base reagents. For example, Cu can be removed via cementation with nickel powder, which requires little acid and no base, and generates no acid; in contrast, removal of Cu by solvent extraction (SX) requires one mole of sulphuric acid per mole of Cu removed, and all of said added acid needs to be neutralized by a base downstream. Other impurities such as Fe and Al can be removed via precipitation by raising the pH (e.g., to about 5.5), which requires added base but no added acid; base which can be introduced as an external neutralizing agent, or as a basic metal salt generated downstream in the process. In contrast, removal of Fe and Al by ion exchange (IX) requires added base to load the Fe and Al onto the exchange column, and it also requires added acid to strip the Fe and Al off the exchange column, and additional reagents or process steps to convert those impurities to a disposable form.

The process described herein may comprise crystallizing a metal sulfate from an aqueous solution to form a crystallized metal sulfate. The refined PLS may be introduced into a crystallizer under conditions sufficient to selectively crystalize or co-crystallize any one or combination of nickel sulfate, cobalt sulfate, manganese sulfate, and/or lithium sulfate from solution. Such selective crystallization occurs against components such as lithium, sodium, potassium, magnesium, that remain in the refined PLS (depending on the feedstock) to provide one or more crystallized metal sulfates (e.g., NMC sulfates and/or lithium sulfates) in a mother liquor.

Different types of crystallizers may be suitable for affecting the selective crystallization or co-crystallization of NMC sulfates and/or lithium sulfates. Such crystallizers include, but are not limited to, evaporative crystallizers, forced circulation (FC) crystallizers, indirect force circulation (IFC) crystallizers, and draft tube baffle (DTB) crystallizers. The conditions and operational parameters for such crystallizers can be selected depending on the type and purity of metal sulfate to be crystallized, and/or the type and concentration of impurities in the PLS. For example, if an IFC or DTB crystallizer is used, coarser crystals may be formed when crystallizing NMC sulfates; this can inhibit the entrainment of impurities during said crystallization, such as lithium, sodium magnesium, and/or potassium. If a forced circulation crystallizer is used, it may be operated under vacuum in order to flash cool the PLS to ambient temperatures (e.g., about 25° C.), which in turn can facilitate water evaporation and NMC sulfate and/or lithium sulfate crystallization. In such cases, the amount of free water being evaporated may be less than the amount necessary to reach a saturation point of certain impurities, such as lithium or sodium. When a crystallizer is used to selectively crystallize nickel sulfate, cobalt sulfate, and manganese sulfate together against impurities such as lithium and sodium, the crystallizer may be operated at a pH level between 1-5, or between 1.5-2.5. In some embodiments, a pH level less than 0, less than 1.5, or between 0.5-1.5 is effective.

Further, the conditions and operational parameters of the crystallizer may be selected to selectively crystallize one metal sulfate, or combination of metal sulfates, over other sulfates and components (e.g., impurities) in solution. For example, when the concentration of one or two metal sulfates are at a very low concentration in the PLS, and a third metal sulfate is at a much higher concentration, careful selection of the crystallizer bleed rate (e.g., a sufficiently high bleed rate) can allow for selective crystallization of the third metal sulfate over the one or two metal sulfates.

The conditions and operational parameters for the crystallizer may also be selected to manage the purity of the crystallized metal sulfates. Bleeding the mother liquor from the crystallizer during crystallization, and the rates at which the bleeding occurs, can impact the purity of the crystallized metal sulfates; for example, by selectively inhibiting crystallization of impurities. As used herein, selecting a bleed rate to selectively inhibit crystallization of a specific impurity means to set a crystallizer bleed rate, within a range of possible bleed rates that inhibits the crystallization of the specific impurity more so than it would inhibit crystallization of a different impurity. The bleed rate may be selected such that it maximizes inhibiting crystallization of the specific impurity. The impurities may be sodium, potassium, magnesium, etc. Using a higher bleed rate of the mother liquor helps to maintain lower concentrations of impurities and other components in the mother liquor that could impact the purity of the crystallized metal sulfates.

Further, impurity solubility can be temperature dependent; therefore, selecting the crystallizer temperatures can be effective in managing the purity of the metal sulfate(s) being crystallized. For example, lithium sulfate solubility decreases with increasing temperature, so if the crystallizer is operated at higher temperatures, any lithium sulfate remaining in the PLS may precipitate out and impact the purity of the crystallized metal sulfates. However, if the crystallizer is operated at lower temperatures, the lithium sulfate may remain in solution and prevent it from coming out of solution with the crystallizing metal sulfate(s). Alternatively, if the crystallizer is operated under different temperature conditions while maintaining the same bleed rate, different levels of impurity contaminations may be obtained. In contrast, the solubility of sodium increases with increasing temperatures. As such, if the crystallizer is operated at higher temperatures, the sodium may remain in solution; and increasing the crystallizer bleed rate may remove the sodium from the crystallizer before it can come out of solution with the crystallizing metal sulfates. However, if the crystallizer is operated at lower temperatures, the sodium remaining in the mother liquor may precipitate, due to its lower solubility, or may react with nickel to form double salts that can impact the purity of the crystallized metal sulfates.

Impurity solubility can also be dependent on the amount of free water present in the PLS and/or mother liquor; therefore, managing water levels in the crystallizer can be an effective means of managing the purity of the metal sulfate (s) being crystallized. For example, in some instances, the metal sulfates crystallize out of solution as metal-sulfate hydrates (i.e., crystallized metal sulfates and water molecules combined in a definite ratio as an integral part of the crystal), which reduces the concentration of water in the mother liquor. By decreasing the concentration of free water, the concentration of impurities (e.g. lithium, sodium, potassium, magnesium, etc.) in the mother liquor may also increase to the point that they crystallize out of solution and impact the purity of the crystallized metal sulfates. However, if a sufficient amount of water is added to the PLS and/or mother liquor when in the crystallizer, or if that amount of excess water remains in the PLS after upstream treatment (e.g., at least as much water as is expected to be lost due to hydrate formation), the presence of that free water can inhibit the crystallization of impurities out of solution.

The crystallized metal sulfates may be isolated from the mother liquor by discharging them from the crystallizer. For example, the crystallized metal sulfates may be discharged as a slurry that is passed to a filter or centrifuge to separate the crystals from the mother liquor. The filtrate or centrate (i.e., mother liquor) may then be passed back to the crystallizer, or a fraction of it may be bled; and the isolated crystals may be washed on the filter or centrifuge and dried. In some instances, using only one crystallizer is insufficient to produce suitably pure, crystallized metal sulfates, such as when the PLS is formed from dirtier feedstocks. Crystals discharged from a first crystallizer may then be dissolved in water (e.g., pure water) before being introduced into a second crystallizer to be recrystallized and further purified.

The process for generating metal sulfates described herein may comprise basifying a portion of the mother liquor to convert an uncrystallized metal sulfate to a basic metal salt. In one or more embodiments of the process described herein, the process comprises basifying the portion of the mother liquor using a second neutralizing agent to convert the uncrystallized metal sulfate to the basic metal salt. In one or more embodiments, converting the basic metal salt back to the uncrystallized metal sulfate comprises using the basic metal salt as a first neutralizing agent to neutralize acid upstream of crystallizing the metal sulfate.

The crystallization mother liquor may contain uncrystallised metal sulfates, in addition to other impurities and components, like salts and metals such as $Li_2SO_4$, $Na_2SO_4$, etc. To selectively recover these uncrystallised metal sulfates and to form basic metal salt(s) for use up-stream as neutralizing agents (also referred to herein as first neutralizing agents), the mother liquor is bled from the crystallizer and basified in order to convert the uncrystallised metal sulphates remaining in the mother liquor to said basic metal salts, such as metal hydroxides (e.g., $Ni(OH)_2$, $Co(OH)_2$, $Mn(OH)_2$, etc.). When basifying the mother liquor, enough base may be added to increase the pH level to between 7.5-10, or between 7.5-9.5. The resultant metal hydroxides precipitate from the mother liquor, and may be isolated from the mother liquor via filtration and washed to form a cake, and may be re-pulped to form a slurry. For example, the metal hydroxides may be recovered by filtration, thickening and filtration, or centrifugation, and then washed on the filter or centrifuge to form the cake. At least a part of the cake may be passed to a re-pulp tank to be slurried using water or process solutions. The metal hydroxides may be selectively precipitated from the mother liquor; for example, via a one-stage or two-stage precipitation circuit. The precipitation circuits can be used to selectively precipitate the metal hydroxides from impurities in the metal hydroxides due to their presence in the mother liquor.

The metal hydroxides are introduced up-stream in the process and are used as a neutralizing agent to neutralize acids introduced at the leaching and/or refining stages. For example, about 0% to 40% of the metal hydroxides (e.g., as a cake) may be introduced into the leaching stage; and about 60% to 100% of the metal hydroxides (e.g., as a cake) may be introduced into the refining stages. Using the metal hydroxides as a neutralizing agent reduces and/or eliminates the need to introduce external neutralizing agents; this reduces reagent use (and associated costs), and reduces and/or eliminates additional sources of impurities that may impact product purity (e.g., cations $Na_+$, $K_+$, $Ca_{2+}$, $Mg_{2+}$ from the external neutralizing agent), and would otherwise require the crystallizer bleed rate to be higher to avoid co-precipitation of the impurities and contamination of the crystallized metal sulfates. In some instances, to ensure that there is a sufficient amount of basic metal salts, e.g., metal hydroxides, available for use as a neutralizing agent, the rate at which the mother liquor is bled from the crystallizer and basified to form the metal hydroxides may be controlled such that the amount of metal hydroxides formed is at least approximately equivalent to, or approximately equivalent to the amount of acid introduced at the leaching and/or refining stages. For example, if the refined PLS is of high purity, the crystallizer bleed rate may not need to be very high to manage the purity of the crystallized metal sulfates (e.g., as described above); however, the crystallizer bleed rate may nonetheless need to be increased to ensure a sufficient amount of metal hydroxides are formed for use upstream. In other instances, the rate at which the mother liquor is bled from the crystallizer and basified to form the metal hydroxides may be controlled such that the amount of metal hydroxides formed in combination with an added amount of external neutralizing agent is at least approximately equivalent to, or approximately equivalent to the amount of acid introduced at the leaching and/or refining stages; however, the amount of external neutralizing agent added would be kept sufficiently low such that use of the external neutralizing agent didn't introduce impurities (e.g., cations $Na_+$, $K_+$, $Li_+$, $Mg_{2+}$, etc.) at a concentration that would impact the purity of the crystallized metal sulfates. In such instances, a combination of the formed metal hydroxides and external neutralizing agent may be used to manage capital and/or operating costs. Further, the rate at which the metal hydroxides are metered to an upstream process may be controlled by a pH setpoint for said process (e.g., leaching, refining, etc.).

Further, using the basic metal salts (e.g., metal hydroxides) as a neutralizing agent converts the basic metal salts back to metal sulfates within the refined PLS. The refined PLS, comprising the converted metal sulfates, then proceeds on to the crystallizer, wherein the converted metal sulfates may be crystallized and isolated from the mother liquor. This loop of isolating and basifying the mother liquor to convert uncrystallised metal sulfates in solution to basic metal salts, and using those basic metal salts as neutralizing agents to convert the basic metal salts back to metal sulfates that can then be isolated via crystallization, can improve the yield of isolated, crystallized metal sulfates obtained from a particular feedstock.

In addition to using the basic metal salts, e.g., metal hydroxides, as a neutralizing agent, the process may use external sources of neutralizing agents (e.g., added oxides, hydroxides, etc.) in the refining stages to neutralize acids, and/or to basify the mother liquor bleed coming out of the crystallizer (also referred to herein as second neutralizing agents). Selecting the type(s) and amount(s) of external neutralizing agent may depend, at least in part, on the nature of the refining stages, and the type of metal sulfate and other components in the mother liquor. As a skilled person would recognize, there are different types of external neutralizing agents that would be suitable for use in the refining stages, and/or for use in basifying the mother liquor. Suitable external neutralizing agents include, but are not limited to, potassium hydroxide (KOH), calcium hydroxide ($Ca(OH)_2$), sodium hydroxide (NaOH), lithium hydroxide (LiOH), or magnesium oxide (MgO). For example, any one or combination of potassium hydroxide (KOH), calcium hydroxide ($Ca(OH)_2$), sodium hydroxide (NaOH), lithium hydroxide (LiOH), and magnesium oxide (MgO) may be used as an external neutralizing agent. A skilled person would also recognize that there are types of external neutralizing agents that would be less suitable for use in the refining stages and/or for use in basifying the mother liquor. For example, use of ammonia as an external neutralizing agent may result in the formation of double salts, such as nickel-ammonium sulfate salts, or metal complexes, such as or Ni and/or Co complexes. Such cations, salts or complexes can make processes non-feasible, and/or increase operational and capital costs due to requisite solvent extraction circuits.

The amount of external neutralizing agent may be selected depending on the nature of the refining stages. For example, if there is a high concentration of Cu that needs to be removed in a refining stage, then a high concentration/volume of neutralizing agent may be needed to neutralize any acid generated in a copper solvent extraction stage. Further, if there is a high concentration of Fe that needs to be removed in a refining stage, then a high concentration/volume of neutralizing agent will be needed to increase the pH and remove the Fe by hydrolysis.

The type of external neutralizing agent may be selected to generate and recover, via a salt recovery step, a particular by-product, such as a by-product that has commercial value. For example, if the external neutralizing agent is selected to be potassium hydroxide, then its use would generate potassium sulfate ($K_2SO_4$), a fertilizer. If the external neutralizing agent is selected to be calcium hydroxide, then its use would generate gypsum ($CaSO_4 \cdot 2H_2O$), a product that may be disposed of as waste, or used in dry-wall and construction. If the external neutralizing agent is selected to be magnesium oxide (MgO), then its use would generate magnesium sulfate. If the external neutralizing agent is selected to be lithium hydroxide (LiOH), then its use would generate lithium sulfate.

The type of external neutralizing agent may also be selected based on its ability to be recovered, via a salt recovery step, and regenerated, so that the neutralizing agent can be used in the process, and then regenerated for re-use. For example, if the external neutralizing agent is selected to be sodium hydroxide, then its use would generate sodium sulfate as a by-product. Sodium hydroxide can be regenerated from sodium sulfate via electrolysis. In general, electrolysis can directly convert the by-product sodium sulfate back to sodium hydroxide for re-use in the process, producing sulfuric acid during the conversion. More particularly, electrolysis uses an applied electric potential and one or more ion selective membrane(s) to regenerate an acid and a base from a salt solution, and is conducted using an electrochemical cell that can comprise two or more compartments separated with selective membrane(s). For example, the electrolysis may involve a 3-compartment cell operating under 6V of potential with a current density between 1500-3000 $A/m_2$, which would be able to produce an approximately 20 wt % solution of sodium hydroxide along with an approximately 10 wt % solution of sulfuric acid from sodium sulfate, both of which can be recycled for use upstream in the process. If the external neutralizing agent is selected to be LiOH, then its use would generate lithium sulfate that could be converted back to LiOH using a downstream recovery step such as basification and crystallisation, or electrolysis, or could be converted to lithium carbonate as a saleable product.

In one or more embodiments, the external neutralizing agent is sodium hydroxide, and its use generates sodium sulfate as a by-product. The sodium sulfate by-product may be used as a sodium sulfate stream in the processes herein disclosed. The sodium sulfate stream may be treated with an ion exchange process to provide a potassium sulfate solution and a sodium chloride brine.

In one or more embodiments of the present disclosure, the process for generating metal sulfates described herein provides the selective crystallization or co-crystallization of any one or combination of nickel sulfate ($NiSO_4$), cobalt sulfate ($CoSO_4$), manganese sulfate ($MnSO_4$), and lithium sulfate ($Li_2SO_4$). In one or more embodiments, the process described herein provides the selective crystallization or co-crystallization of one or two of crystalized nickel sulfate ($NiSO_4$), cobalt sulfate ($CoSO_4$), and manganese sulfate ($MnSO_4$). In one or more embodiments, the process described herein provides the selective co-crystallization of all three of crystalized nickel sulfate ($NiSO_4$), cobalt sulfate ($CoSO_4$), and manganese sulfate ($MnSO_4$). In one or more embodiments, the process described herein provides battery-grade, crystallized metal sulfates. In one or more embodiments, the process provides electroplating-grade, crystallized metal sulfates. In one or more embodiments, the process described herein does not use solvent extraction circuits to isolate battery-grade, crystallized metal sulfates. In one or more embodiments, the process described herein reduces capital and operating costs; increases yield of crystallized metal sulfates; and/or reduces or eliminates sodium sulfate as a solid waste (when sodium hydroxide is used as an external neutralizing agent, and the sodium sulfate is converted back to sodium hydroxide via electrolysis, or where the amount of external neutralising agent required is reduced).

In some embodiments, the process described herein reduces capital and operating costs because it uses a crystallizer to isolate crystallized metal sulfates, in place of solvent extraction circuits. While crystallization requires energy input, it does not require use of added reagents, thereby reducing operating costs. Further, the capital costs associated with crystallization are lower than those associated with solvent extraction circuits.

In other embodiments, the process described herein reduces capital and operating costs by reducing reagent use. For example, a nickel solvent extraction circuit to form nickel sulfate requires the consumption of 1 mole of sulfuric acid and 2 moles of sodium hydroxide per mole of nickel sulfate produced. In contrast, crystallization does not require the use of any added reagents. The process described herein can reduce reagent use even if a solvent extraction step is used as part of the refining stage, as said solvent extraction will generally experience a smaller load (i.e., impurities at lower concentrations), and so will require less acid and base. In some embodiments, the process described herein reduces capital and operating costs by reducing the number of processing steps. Reducing the number of process steps not only reduces capital and operating costs, it also reduces the complexity of the process, and therefore reduces the complexity of the infrastructure and skillsets needed to conduct the process. For example, solvent extraction is a relatively complex unit operation requiring multiple stages of extraction, scrubbing, and stripping; and requiring systems for treatment of aqueous discharge streams, crud removal, organic vapor recovery, and fire protection. By using a crystallizer to isolate crystallized metal sulfates, in place of solvent extraction circuits, such process complexity (and associated costs) can be avoided.

In other embodiments, the process described herein increases yield of crystallized metal sulfates by reducing or preventing the addition of specific impurities or components in the leaching and/or refining stages of the process, such as lithium, sodium, potassium, or magnesium. For example, as the one-pass yield of crystallized metal sulfates increases in the crystallizer, the concentrations of impurities such as lithium, sodium, etc. in the mother liquor also increases. As a result, the crystallizer bleed rate must also increase to manage the purity of the crystallized metal sulfates (for example, by inhibiting or preventing the impurities from approaching their saturation concentrations in the mother liquor). However, increasing the crystallizer bleed rate may create inefficiency, as the bled uncrystallised metal sulfates will be basified and precipitated, consuming reagents. As such, reducing or preventing the addition of these impurities in the leaching and/or refining stages of the process means the crystallizer can be operated at a lower bleed rate while avoiding co-crystallization of impurities with the metal sulfates, which can improve the one-pass yield of crystallized metal sulfates while also decreasing operational costs. In one or more embodiments of the process of the present disclosure, the addition of specific impurities (e.g., lithium, sodium, magnesium, etc.) is reduced or prevented by using the basic metal salts (e.g., the metal hydroxides $Ni(OH)_2$, $Co(OH)_2$, $Mn(OH)_2$, etc.) precipitated from the mother liquor that is bled from the crystallizer. In some embodiments, precipitation and washing of the basic metal salts is carefully controlled (e.g., by selection of pH levels, use of two-stage precipitation circuits, etc.) to reduce or prevent precipitating impurities (e.g., lithium, sodium, magnesium, etc.) into the basic metal salts.

In some embodiments, the process described herein increases yield of crystallized metal sulfates by using a loop of isolating and basifying crystallization mother liquors to convert uncrystallised metal sulfates in solution to basic metal salts (e.g., metal hydroxides), and using those basic metal salts as neutralizing agents to convert the salts back to metal sulfates for crystallization. The iterative nature of the loop ensures a very good recovery of crystallized metal sulfates.

In other embodiments, the process described herein reduces or eliminates sodium sulfate as a waste stream by regenerating sodium hydroxide from sodium sulfate. Sodium sulfate is a by-product with a marketability that is generally concerned to be poor, with the potential to be a costly waste issue, both from an environment and financial standpoint.

As used in the specification and claims, the singular forms "a", "an" and "the" include plural references unless the context clearly dictates otherwise. The term "comprising" as used herein will be understood to mean that the list following is non-exhaustive and may or may not include any other additional suitable items, for example one or more further feature(s), component(s) and/or ingredient(s) as appropriate.

As used herein, "NMC" refers to nickel, manganese, and/or cobalt. For example, NMC sulfates refers to nickel sulfate, manganese sulfate, and/or cobalt sulfate. As used herein, "metal sulfates" refers to any one or combination of nickel sulfate, cobalt sulfate, and/or manganese sulfate. Further, "metal hydroxides" refers to any one or combination of nickel hydroxide, cobalt hydroxide, and/or manganese hydroxide.

As used herein, "crystallization", "crystallizing", or "crystallized" refers to the process of forming a crystal network that selectively and slowly formed from metal sulfates in a PLS, resulting in a pure crystalline compound (at least as indicated by x-ray diffraction). In contrast, as used herein, "precipitation" refers to a process characterized by the addition of a basification reagent and the formation of a crystalline or amorphous solid from solution. As used herein, "co-crystallize" or "co-crystallizing" refers to crystallizing two or more components (e.g., metal sulfates, impurities, etc.) out of solution together (e.g., at the same time). Used herein, when referencing "selectively crystallizing" or "selectively co-crystallizing" metal sulfates, "selective" refers to crystallizing the metal sulfate away from most, if not all impurities or other components; in other words, "selective" refers to forming a pure, crystallized metal sulfate.

Used herein, when referencing "selectively precipitated" basic metal salts, e.g., metal hydroxides, "selective" refers to precipitating the basic metal salt away from most, if not all impurities or other components; in other words, "selective" refers to forming a pure basic metal salt.

Used herein, "an amount of acid to be neutralized upstream of crystallizing the metal sulfate" refers to: (i) neutralizing acid that has been added into the process upstream of crystallizing the metal sulfate (e.g., in a leaching stage and/or a refining stage(s)); (ii) neutralizing acid that is generated during a refining stage to remove an impurity and/or a component; or (iii) a combination of both. The amount of acid that has been added, or generated will depend on the conditions of the leaching stage and/or refining stage(s), and would be determinable in view of the feedstock being used and the known impurities and components thereof, the refining stages being used to process the pregnant leach solution generated from the leaching stage, and the chemical reactions/processes and stoichiometry thereof for each of the leaching and refining stages.

Used herein, "free water" refers to the water that makes up the liquid phase of an aqueous solution that is not part of a hydration sphere and/or has not been incorporated into a lattice structure. "Amount of free water" refers to the volume (e.g., mL, L) of free water that is present in the aqueous solution.

The embodiments described herein are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A process for battery chemical production, comprising:
   receiving at least a portion of a sodium sulfate stream;
   pre-treating the sodium sulfate stream to remove free water and/or at least one of Ni, Mn, Co, Li from the stream;
   applying an ion exchange process to the sodium sulfate stream to provide potassium sulfate and sodium chloride;
   applying a chlor-alkali process to the sodium chloride to provide sodium hydroxide; and
   returning at least a portion of the sodium hydroxide for use upstream in the battery chemical production process.

2. The process of claim 1, wherein the ion exchange process comprises:
   contacting an ion exchange resin with the sodium sulfate stream to load the ion exchange resin with sulfate ion;
   contacting the loaded ion exchange resin with potassium chloride to form an exit brine comprising potassium sulfate and potassium chloride;
   adding potassium chloride to the exit brine to salt out at least a portion of the potassium sulfate, to form solid potassium sulfate and a solution comprising potassium chloride; and
   regenerating the ion exchange resin with a sodium sulfate solution or the sodium sulfate stream to provide an exit regeneration brine comprising sodium chloride.

3. The process of claim 2, wherein the ion exchange process further comprises:
   recycling the solution comprising potassium chloride for use upstream in the ion exchange process.

4. The process of claim 1, wherein the ion exchange process further comprises:

adding sodium chloride to the exit regeneration brine to salt out at least a portion of residual sodium sulfate, to form solid sodium sulfate and a solution comprising sodium chloride.

5. The process of claim 4, wherein the solution comprising sodium chloride is the sodium chloride provided to the chlor-alkali process.

6. The process of claim 1, wherein the ion exchange process further comprises:
cooling the exit regeneration brine to salt out at least a portion of residual sodium sulfate, to form solid sodium sulfate and a solution comprising sodium chloride.

7. The process of claim 1, wherein the sodium sulfate stream is from a metal sulfate production process, a lithium hydroxide production process, a battery chemical precursor production process, or a process that consumes sodium hydroxide.

8. The process of claim 1, further comprising recovering chlorine in the form of $Cl_2$ or HCl from the chlor-alkali process.

9. The process of claim 1, further comprising returning the sodium hydroxide for use upstream in a nickel sulfate production process, a cobalt sulfate production process, a manganese production process, an iron removal process, a solvent extraction process, a process for converting lithium sulfate to lithium hydroxide, or a precursor chemical cathode material process.

10. The process of claim 1, wherein:
receiving at least a portion of the sodium sulfate stream comprises
receiving a crystallization mother liquor from a battery chemical or lithium chemical production process,
the mother liquor comprising uncrystallized metal sulfate,
basifying a portion of the mother liquor with a basic sodium salt,
converting the uncrystallized metal sulfate to a basic metal salt, and
forming the sodium sulfate stream;
pre-treating the sodium sulfate stream comprises
evaporating free water from the sodium sulfate stream, and/or
subjecting the sodium sulfate stream to one or more refining stages, one or more crystallization cycles, or a combination thereof to remove the at least one Ni, Mn, Co, Li;
and/or
pre-treating the sodium sulfate stream further comprises removing at least one Zn, Fe.

11. A process for battery chemical production or lithium chemical production comprising:
receiving at least a portion of a sodium sulfate stream from a metal sulfate production process, a lithium hydroxide production process, a battery chemical precursor production process, or a process that consumes sodium hydroxide;
pre-treating the sodium sulfate stream to remove free water and/or at least one of Ni, Mn, Co, Li from the stream; and
treating the sodium sulfate stream with an ion exchange process to provide a potassium sulfate solution and a sodium chloride brine.

12. The process of claim 11, further comprising treating the potassium sulfate solution with potassium chloride to precipitate at least a portion of the potassium sulfate.

13. The process of claim 12, wherein the precipitated potassium sulfate is separated to provide solid potassium sulfate and a potassium chloride brine.

14. The process of claim 11, wherein the ion exchange process comprises:
contacting an ion exchange resin with the sodium sulfate stream to load the ion exchange resin with sulfate ion;
contacting the loaded ion exchange resin with potassium chloride to form the potassium sulfate solution as an exit brine; and
regenerating the ion exchange resin with the sodium sulfate stream or an aqueous solution of soluble sulfate to form the sodium chloride brine as an exit regeneration brine.

15. The process of claim 14, wherein the ion exchange process further comprises:
adding sodium chloride to the exit regeneration brine to remove residual sulfate and to form a solution comprising sodium chloride.

16. The process of claim 15, wherein the solution comprising sodium chloride is provided to a chlor-alkali process to provide sodium hydroxide.

17. The process of claim 16, wherein the chlor-alkali process also provides chlorine in the form of $Cl_2$ or a subsequent process generates HCl from the $Cl_2$.

18. The process of claim 16, wherein the sodium hydroxide is for use in a nickel sulfate production process, a cobalt sulfate production process, a manganese sulphate production process, a solvent extraction process, an iron removal process, a process for converting lithium sulfate to lithium hydroxide, or a precursor chemical cathode material process.

19. The process of claim 14, wherein the ion exchange process further comprises:
cooling the exit regeneration brine to remove residual sulfate and to form a solution comprising sodium chloride.

20. The process of claim 11, wherein:
receiving at least a portion of the sodium sulfate stream comprises
receiving a crystallization mother liquor from a battery chemical or lithium chemical production process,
the mother liquor comprising uncrystallized metal sulfate,
basifying a portion of the mother liquor with a basic sodium salt,
converting the uncrystallized metal sulfate to a basic metal salt, and
forming the sodium sulfate stream;
pre-treating the sodium sulfate stream comprises
evaporating free water from the sodium sulfate stream, and/or
subjecting the sodium sulfate stream to one or more refining stages, one or more crystallization cycles, or a combination thereof to remove the at least one Ni, Mn, Co, Li;
and/or
pre-treating the sodium sulfate stream further comprises removing at least one Zn, Fe.

21. An ion exchange process for producing potassium sulfate from sodium sulfate, comprising:
receiving a sodium sulfate stream from a battery chemical or lithium chemical production process, the sodium sulfate being a by-product of battery chemical or lithium chemical production process;
pre-treating the sodium sulfate stream to remove free water and/or at least one of Ni, Mn, Co, Li from the stream;

subjecting the pre-treated stream to ion exchange to provide potassium sulfate and sodium chloride; and providing an exit brine from the ion exchange process, the exit brine comprising potassium sulfate and potassium chloride, and treating said exit brine with potassium chloride to salt out the potassium sulfate.

22. The process of claim 21, wherein the ion exchange process comprises:

contacting an ion exchange resin with the pre-treated sodium sulfate to load the ion exchange resin with sulfate ion; and contacting the loaded ion exchange resin with potassium chloride to form the exit brine.

23. The process of claim 22, wherein the potassium sulfate salted out of the exit brine is separated to provide solid potassium sulfate and a potassium chloride brine.

24. The process of claim 23, wherein the potassium chloride brine is recycled for use upstream in the ion exchange process.

25. The process of claim 22, wherein the ion exchange process further comprises regenerating the ion exchange resin with the sodium sulfate from the battery chemical or lithium chemical production process, or an aqueous solution of sodium sulfate to provide a sodium chloride brine.

26. The process of claim 25, wherein the ion exchange process further comprises cooling the sodium chloride brine to salt out at least a portion of residual sulfate.

27. The process of claim 25, wherein a chlor-alkali process is applied to the sodium chloride brine to provide sodium hydroxide and chlorine in the form of $Cl_2$ or HCl.

28. The process of claim 27, wherein the sodium hydroxide is for use in a nickel sulfate production process, a cobalt sulfate production process, a manganese sulphate production process, a solvent extraction process, an iron removal process, a process for converting lithium sulfate to lithium hydroxide, or a precursor chemical cathode material process.

29. The process of claim 21, wherein:

receiving at least a portion of the sodium sulfate stream comprises receiving a crystallization mother liquor from a battery chemical or lithium chemical production process, the mother liquor comprising uncrystallized metal sulfate, basifying a portion of the mother liquor with a basic sodium salt, converting the uncrystallized metal sulfate to a basic metal salt, and forming the sodium sulfate stream;

pre-treating the sodium sulfate stream comprises evaporating free water from the sodium sulfate stream, and/or subjecting the sodium sulfate stream to one or more refining stages, one or more crystallization cycles, or a combination thereof to remove the at least one Ni, Mn, Co, Li;

and/or pre-treating the sodium sulfate stream further comprises removing at least one Zn, Fe.

* * * * *